United States Patent [19]

Armbrust et al.

[11] B 3,981,477

[45] Sept. 21, 1976

[54] DIE SEGMENT FOR BRIQUETTING ROLL

[75] Inventors: William D. Armbrust, Greensburg; Dennis J. Shallenberger, Latrobe; Charles E. Hill, Whitney, all of Pa.

[73] Assignee: Kennametal Inc., Latrobe, Pa.

[22] Filed: Feb. 7, 1975

[21] Appl. No.: 548,155

[44] Published under the second Trial Voluntary Protest Program on January 13, 1976 as document No. B 548,155.

Related U.S. Application Data

[62] Division of Ser. No. 455,518, March 28, 1974, Pat. No. 3,883,282.

[52] U.S. Cl. ................................ 249/135; 425/195; 425/237; 425/363; 249/187 R

[51] Int. Cl.[2] ........................................... B29C 3/02

[58] Field of Search ........... 425/194, 195, 237, 363, 425/470; 249/187 R

[56] References Cited

UNITED STATES PATENTS

| | | | |
|---|---|---|---|
| 1,775,277 | 9/1930 | Gahn | 425/237 X |
| 2,945,259 | 7/1960 | Decker et al. | 425/237 X |
| 3,077,634 | 2/1963 | Komarek et al. | 425/237 |
| 3,829,267 | 8/1974 | Woodward | 425/237 |

*Primary Examiner*—J. Howard Flint, Jr.
*Attorney, Agent, or Firm*—Melvin A. Crosby

[57] ABSTRACT

A die segment for a briquetting roll in which the roll is a steel body which is provided with a peripheral groove having a radially outwardly facing bottom wall which is made up of planar chordal segments and having side walls at the side edges of the bottom wall with one side wall inclined inwardly in the outward direction and being in the form of an annular segment of a cone concentric with the axis of the roll and the other side wall substantially radial. The die segments are bodies of hard wear resistant material mounted in the groove, one on each chordal section of the bottom wall of the groove and each has one side inclined to fit the inclined wall of the groove with the other side spaced from and diverging from the radial side wall in the outward direction. Wedge bars between the radial side wall of the groove and the opposed sides of the die segments are utilized for clamping the segments in place in the roll.

9 Claims, 3 Drawing Figures

DIE SEGMENT FOR BRIQUETTING ROLL

RELATED APPLICATION

The present application is a division of U.S. Ser. No. 455,518, filed Mar. 28, 1974, now U.S. Pat. No. 3,883,282, and entitled "BRIQUETTING ROLL AND POCKETED SEGMENTS THEREFOR." The present invention relates to briquetting machines and is particularly concerned with the construction of die segments of hard wear resistant material for mounting in a peripheral groove in a steel roll forming the body of a briquetting roll.

Briquetting devices are known and, in general, comprise a pair of rolls, or wheels, running on parallel axes with the peripheries in juxtaposed relation at one peripheral point and with the rolls rotating in respectively opposite directions. Material introduced between the rolls on the downgoing sides of the rolls is captured by segments mounted on the rolls and is formed into briquettes in pockets which are formed in the opposed sides of the segments.

Many different arrangements have been provided for clamping the segments in such a roll and for forming the segments themselves but, heretofore, certain difficulties have presented themselves in respect of the cost of manufacture and the rigidity with which the segments are held in place and the like.

With the foregoing in mind, the primary object of the present invention is the provision of an improved die segment for such a briquetting roll and to a segment clamping arrangement therefor.

A further object is the provision of a briquetting roll die segment which can be manufactured more inexpensively than briquetting roll arrangements according to the prior art.

BRIEF SUMMARY OF THE INVENTION

According to the present invention, the briquetting roll consists of a steel wheel or roll adapted for being mounted on a shaft to be rotated thereby. A radially outwardly opening annular groove is formed in the periphery of the roll with the groove consisting of a plurality of planar chordal sections of equal size in end to end relation and each perpendicular to a radius of the roll passing through the geometric center of the respective chordal section.

The groove when viewed in cross section has one side wall upstanding therefrom in the radial direction, while the other side wall is in the form of an annular section of a cone which is coaxial with the axis of the roll. The cone is so disposed that the side wall of the groove which pertains thereto converges in the radially outward direction with the radial side wall of the groove.

A pocketed die segment formed of a hard wear resistant material such as a cemented hard metal carbide, tungsten carbide, for example, is mounted on each chordal section of the bottom wall of the groove and has one side configured to engage the conical side of the side wall while the other side of the respective segment is spaced from the radial side wall of the groove and diverges therefrom in the radially outward direction. Each segment has a flat bottom wall resting on the respective chordal section while the outer side of each segment is concentric with the axis of the roll and is formed with one or more pockets or portions of pockets in which the material to be briquetted will be compacted.

Each die segment is held in place by a respective wedge bar that is disposed between the radial side wall of the groove and the opposed side of the respective segment and which is fixed to the roll by screws extending through the wedge bar and threaded into the roll. The provision of the wedge bar provides for positively clamping the segments in place on the roll while, simultaneously, each segment is held in lateral compression thereby assisting in the development of the strength of the hard material from which the segments are made.

These and other objects and advantages of the present invention will become more apparent upon reference to the following detailed specification taken in connection with the accompanying drawings in which.

DETAILED DESCRIPTION OF THE INVENTION

Figure 1:
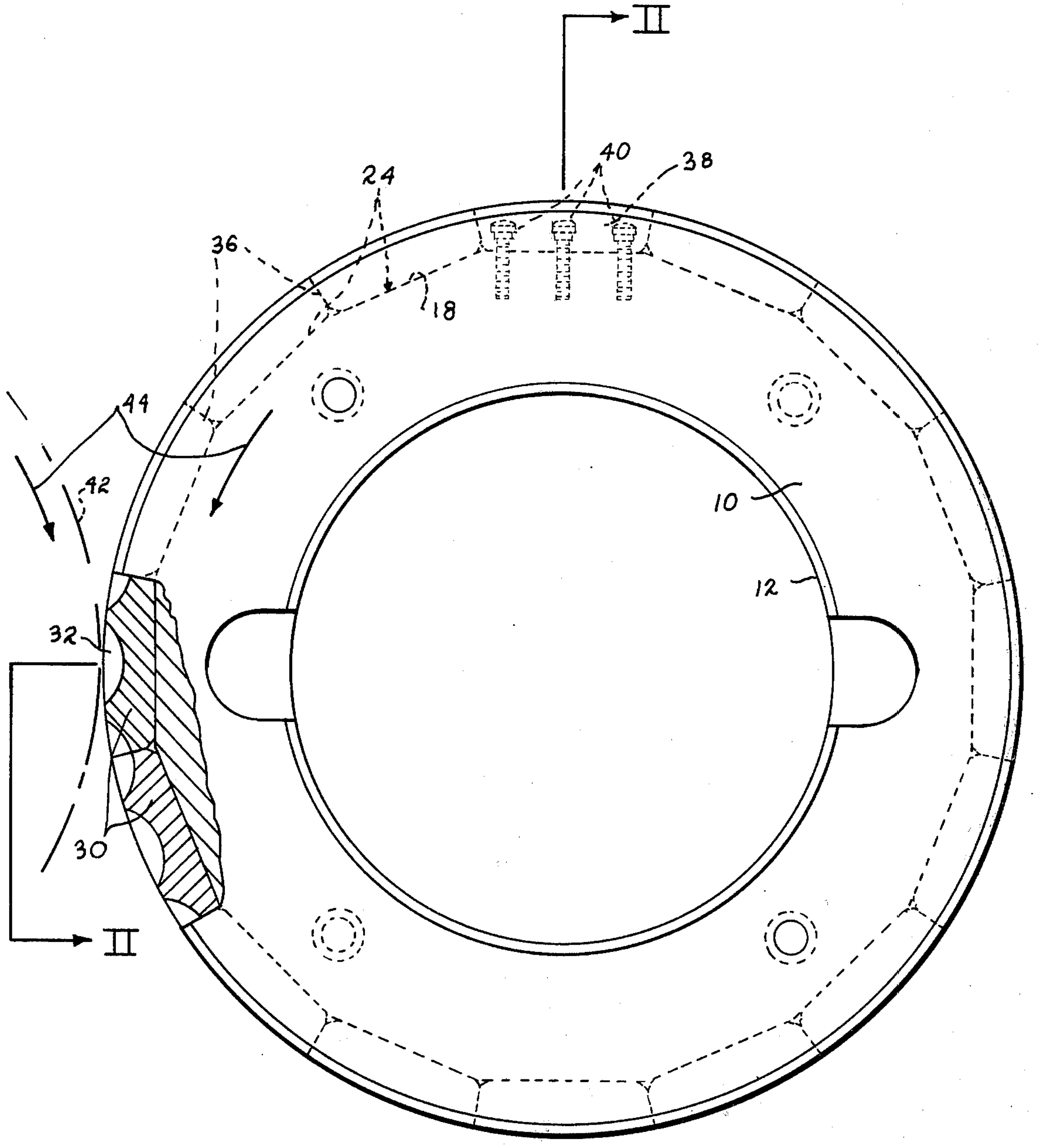
FIG. 1 is a side view partly broken away of a briquetting wheel or roll according to the present invention.
Figure 2:
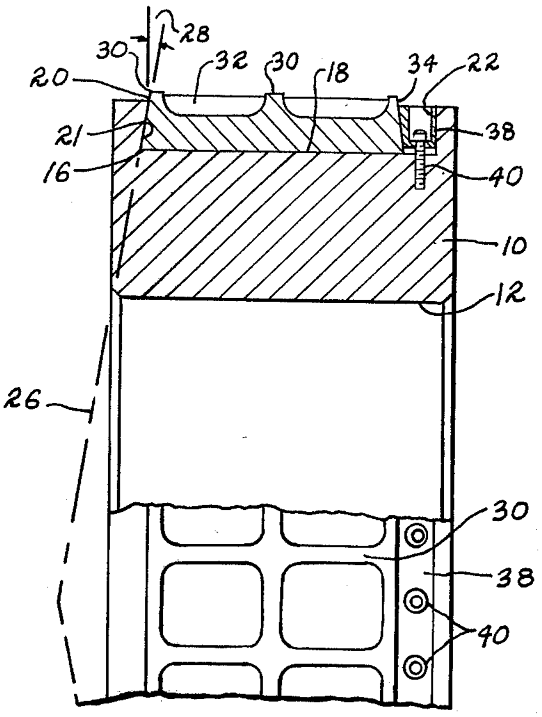
FIG. 2 is a section indicated on line II—II of FIG. 1.

Referring to the drawings somewhat more in detail, the briquetting wheel, or roll, shown in FIGS. 1 and 2 comprises a steel body 10 which may have a central bore 12 of substantial size. The bore might, for example, be about 10¾ inches in diameter, while the overall diameter of the steel part of the roll might be, for example, 17¾ inches in diameter.

As will best be seen in FIG. 2, the roll has an annular groove 16 formed therein and consisting of a bottom wall 18 and two side walls 20 and 22. As will be seen in FIG. 2, the steel body of the roll may be about 6 inches long and the groove may be about 5 inches long.

The bottom wall 18 will be seen in FIG. 1 to be made up of a plurality of planar chordal sections 24, all of equal length and each perpendicular to a respective radius of body 10 and all disposed an equal radial distance outwardly from the axis of rotation of body 10.

At one side, wall 22 of the groove 16 is radial but may differ from the radial a substantial amount as will become apparent hereinafter.

A particularly important feature of the present invention is to be found in respect of side wall 20 which is opposed to side wall 22. Side wall 20 is in the form of an annular section of a cone which is coaxial with body 10. The outline of the cone is indicated at 26 in FIG. 2, and it will be seen to be a relatively wide angle cone with the cone sides making an angle, designated 28, of about 7½ degrees with a radius to roll body 10.

The important thing about the angularity of side wall 22 is that this side wall converges with radial side wall 20 in the radially outward direction so that the die segments to be carried by the roll will be positively clamped therein when the assembly is completed. It will be evident that the side wall 22 is advantageously radial because this represents the simplest machining operation to carry out on that side wall. The other side wall 20 can also be relatively simply formed by a turning operation while the planar chordal sections 24 making up the bottom wall 18 of groove 16 can be formed by milling.

Mounted on each of the aforementioned planar chordal sections 24 of bottom wall 18 of groove 16 is a respective die segment 30.

Segments 30 have pockets, or portions of pockets, 32 formed in the outwardly facing side thereof in which the material to be briquetted will be compacted when the machine is in operation. As will be seen in FIG. 1, the outwardly facing side of each segment is concentric with the axis of roll body 10 while the inwardly facing side of each segment is planar and rests on a respective chordal section in face to face engagement therewith.

The die segments, in order to obtain suitable wear life, are advantageously formed of a cemented hard metal carbide material, such as tungsten carbide, and proper support of members made of this material is important. The material is extremely abrasion resistant and strong in compression but is relatively weak in tension and is rather brittle.

Members made of this material can, thus, be fractured relatively readily unless the members are firmly supported at all times. The wheel body of the present invention provides such support because the flat chordal sections 24 engage the bottoms of the segments while on the side edges 21 of the segments facing wall 22 the segments have a corresponding configuration and each is, thus, in face to face engagement with a respective segmental region of side wall 20.

The opposite side edge 34 of each segment is inclined at an angle of about 7½° to the radial direction of roll body 10 and this side edge of each insert is axially spaced from the opposite side wall 22 of the groove. Each end edge of the segments; said end edges being indicated at 36 in FIG. 1; are radial to the roll body 10 and in abutment with the end edges of the next adjacent segments.

Disposed between side edges 34 of each die segment and side wall 22 of the roll body is a wedge member 38 configured on one side for face to face engagement with side wall 22 of the groove and on the other side for face to face engagement with the opposed side edge of the respective die segment. Each wedge bar has screws 40 extending therethrough and threaded into the roll body 10 so that each wedge bar can be pulled down firmly into wedging engagement with the respective segment 30.

When the wedge bars are pulled up tight, all of the segments are pressed firmly against side wall 20 of the groove and against the respective chordal section of the bottom wall of the groove while, furthermore, each segment is held in a state of lateral compression thereby enhancing the useful strength of the segments.

The wedge bars 28, similarly to the segments 30, have their ends radial to the roll body 10 and are preferably in substantially end to end engagement when the wedge bars are pulled down into clamping position.

The roll assembly illustrated in only one of several sizes that can be made and has sixteen segments and wedge bars. This proves to be a practical arrangement for a briquetting roll of the size illustrated.

In operation, the roll illustrated runs together with another roll, a fragment of which is indicated in dot-dash outline at 42 in FIG. 1. The rolls are mounted on parallel axes and are keyed to the respective shafts with the shafts being geared together or synchronized in some suitable manner so that the pockets on the respective rolls always remain in the same condition of registration. The rolls turn in the direction indicated by the arrows 44 in FIG. 1, and granulated material supplied to the bight of the rolls in FIG. 1 will be compacted in the pockets of the segments and will come out at the bottom in the form of briquettes.

An important feature that results from the novel arrangement according to the present invention in which the side wall 20 of the wheel and the opposed side edges 21 of the segments are in the form of an annular segment of a cone is that these surfaces can be formed relatively simply on the respective members while, at the same time, each segment is fixedly located in the proper position on the roll body because each segment rests on a respective flat chordal section of the bottom wall of the groove.

Any tendency for a segment to move peripherally on the roll, due to the forces exerted thereon during a briquetting operation, and which movement would be parallel to the flat bottom surface of the segment, will be strongly opposed by the change in relationship that such movement would cause between the curved side edge 21 of the respective segment and the curved side wall 20 of the groove which is engaged thereby.

It has been found that the simple expedient of curving wall 20 in the described manner and curving the opposed side edges 21 of the segments 30 for face to face engagement therewith provides for the strong holding of the segments in place against peripheral shifting of the segments on the roll body while, at the same time, this beneficial end result is obtained in a quite inexpensive manner.

Figure 3:
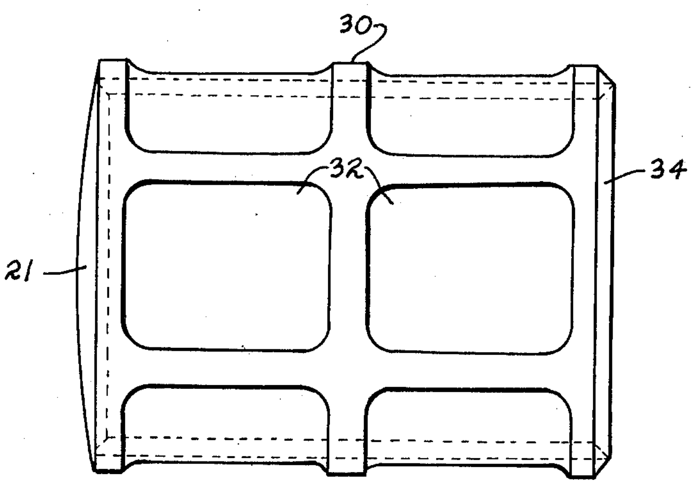
FIG. 3 is a plan view of a typical segment for a briquetting wheel.

FIG. 3 shows a segment 30 in a plan view with the inclined edge 34 at one side and the conical side edge 21 at the other side.

Modifications may be made within the scope of the appended claims.

What is claimed is:

1. A die segment for a briquetting roll comprising; a body of hard wear resistant material having end edges and side edges and oppositely facing first and second major surfaces, one major surface having pocket means formed therein, the other major surface being disposed in a first flat plane, one side edge being disposed in a second flat plane at an angle to said first plane, and the other said side edge being in the form of an angular segment of an annular section of a cone.

2. A die segment according to claim 1 in which said side edges when the segment is viewed in cross section converge toward the side of the die segment which said one major surface faces.

3. A die segment according to claim 1 in which the plane of said one side edge makes an angle of less than 90° with said first plane.

4. A die segment according to claim 1 in which said one major surface is convex away from said body.

5. A die segment according to claim 1 in which said end edges are disposed in respective planes which converge in the direction which said other major surface faces.

6. A die segment according to claim 1 in which said one major face is concentric with an axis parallel to the other major face and spaced from said body on the side toward said other major face, said end edges being disposed in respective planes which are so inclined as to intersect on said axis, said annular section of a cone being a section of a cone with the axis coinciding with the first mentioned said axis.

7. A die segment according to claim 6 in which the angle between the sides of said cone is about 165°.

8. A die segment according to claim 1 in which said hard wear resistant material is a cemented hard metal carbide.

9. A die segment according to claim 8 in which said metal carbide comprises tungsten carbide.

* * * * *